B. Merritt, Jr.
Rolling Metals.

N°. 41,851.   Patented Mar. 8, 1864.

Witnesses:
Thos R Roach
P E Tischemacher

Inventor:
Benj Merritt jr

UNITED STATES PATENT OFFICE.

BENJAMIN MERRITT, JR., OF NEWTON, MASSACHUSETTS.

IMPROVEMENT IN ROLLS.

Specification forming part of Letters Patent No. 41,851, dated March 8, 1864.

*To all whom it may concern:*

Be it known that I, BENJAMIN MERRITT, Jr., of Newton, in the county of Middlesex and State of Massachusetts, have invented an Improved Equable Pressure-Roll, of which the following is a full, clear, and exact description, reference being had to the accompanying drawings, making part of this specification, in which—

Figure 1:
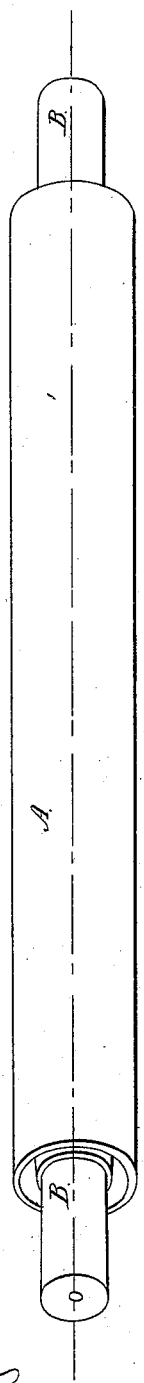
Figure 2:
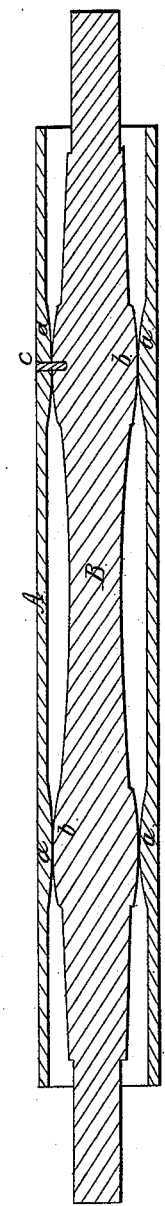

Figure 1 is a perspective view of my improved roll; Fig. 2, a longitudinal section through the same.

A great difficulty has been experienced with pressure-rolls constructed of one solid piece of metal, as heretofore, on account of their liability to spring in the middle of their length when any unyielding substance was passed between them. To make them sufficiently rigid to overcome this tendency to spring they have necessarily been constructed of much greater diameter and weight than would otherwise be required, thus greatly increasing their cost, and the weight of the machine to which they were applied, and if the roll was of considerable length it was still liable to spring in a slight degree.

My invention has for its object to avoid these objections; and it consists in a pressure-roll made of a metal tube or shell, through which passes a shaft having heads or bearings at a distance of about one-fourth the length of the roll from its ends, which fit the interior of the tube at the corresponding points, and thus support it nearer to its center, the remainder of the shaft being of less diameter than the interior of the tube, so as to permit it to spring inside of it between the heads or bearings, which prevents the springing of the exterior or bearing surface of the roll.

To enable others skilled in the art to understand and use my invention, I will proceed to describe the manner in which I have carried it out.

In the said drawings A, is a tube of wrought-iron or other suitable metal, of sufficient thickness and strength to resist the pressure to be brought upon it, the interior diameter of which is contracted at the points $a$ by pressure applied to its exterior surface, which is afterward turned off smooth in a lathe. This hollow tube A is supported on a shaft, B, having heads or bearings $b$ placed at or about one-fourth of the length of the roll from its ends, and is tapered from the heads $b$ gradually toward the center and extremities, as seen in Fig. 2. These heads are turned of such a diameter as to fit tightly into the contracted portions of the tube A, which are first bored out smooth to receive them, and the corners of the heads $b$ are rounded off or made slightly crowning, so as to prevent them from indenting or taking a pry in the tube at the points of contact $a$, when the shaft B springs, which would tend to loosen it within the tube A. The tube A, having been heated, is slipped over the shaft B, and shrunk in place, where it may be still further secured by one or more rivets, $c$, which pass through the tube A into the heads or bearings $b$.

It will thus be seen that the outer shell or tube, A, being supported at the points $a$ about half-way between the center and its ends, the pressure applied by passing a hard or unyielding substance between the rolls will be equalized to a great extent, and the springing of the exterior tube A will be effectually prevented by the elasticity of the shaft B within it.

I have spoken of the tube or shell A as made of wrought-iron. It can, however, be equally as well constructed of cast-iron or other suitable metal.

My invention is also particularly applicable to engraved copper rolls or cylinders, which it has heretofore been necessary to construct of great diameter in order to insure a sufficient degree of rigidity. By my improved method, however, they can be made of much less diameter and still possess the requisite rigidity, thereby effecting a great saving in the cost of construction.

It is obvious that my improvements are applicable to any form of pressure roll or cylinder, or wherever it is desired to avoid the objections arising from the springing of the roll.

What I claim as my invention, and desire to secure by Letters Patent, is—

A pressure-roll consisting of an exterior metallic shell, A, supported on a metal shaft, B, having heads or bearings at $b\ a$ placed at or about one-fourth the length of the roll from its ends, and the shaft reduced in diameter each side of said bearings, in the manner and for the purpose substantially as set forth.

BENJ. MERRITT, JR.

Witnesses:
THOS. R. ROACH,
P. E. TESCHEMACHER.